US011821773B1

(12) United States Patent
Sabraoui et al.

(10) Patent No.: US 11,821,773 B1
(45) Date of Patent: Nov. 21, 2023

(54) ULTRASONIC FLUID METER INCORPORATING TWO PRESSURE SENSORS

(71) Applicant: SAGEMCOM ENERGY & TELECOM SAS, Rueil Malmaison (FR)

(72) Inventors: Abbas Sabraoui, Rueil Malmaison (FR); Ahmet Samed Basturk, Rueil Malmaison (FR); Oussama Abid, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 18/140,374

(22) Filed: Apr. 27, 2023

(30) Foreign Application Priority Data

Apr. 29, 2022 (FR) .................................. FR2204102

(51) Int. Cl.
*G01F 1/66* (2022.01)
*G01F 1/36* (2006.01)
*G01F 1/667* (2022.01)
*G01F 1/696* (2006.01)

(52) U.S. Cl.
CPC ................ *G01F 1/667* (2013.01); *G01F 1/36* (2013.01); *G01F 1/662* (2013.01); *G01F 1/696* (2013.01)

(58) Field of Classification Search
None
See application file for complete search history.

(56) References Cited

U.S. PATENT DOCUMENTS

| 10,295,387 | B2 * | 5/2019 | Bonomi | .................. G01F 1/662 |
| 2014/0299210 | A1 * | 10/2014 | Atherton | ................... G01F 1/74 |
| | | | | 137/624.27 |
| 2018/0195889 | A1 * | 7/2018 | Skelding | .............. G01N 29/024 |
| 2020/0256713 | A1 | 8/2020 | Kabrich | |

FOREIGN PATENT DOCUMENTS

| DE | 102019105948 A1 | 9/2020 |
| EP | 3643955 A1 | 4/2020 |

\* cited by examiner

*Primary Examiner* — Harshad R Patel
(74) *Attorney, Agent, or Firm* — Muncy, Geissler, Olds & Lowe, P.C.

(57) ABSTRACT

An ultrasonic fluid meter comprises a conduit (4) in which a fluid can flow, an ultrasonic measurement device (6) for evaluating a current flow rate of the fluid, a valve (12) comprising a moving member (14) for controlling the current flow rate of the fluid, a position sensor (15) for measuring a current position of the moving member (14), a first pressure sensor (16) for measuring a first pressure of the fluid upstream of the valve (12), and a second pressure sensor (17) for measuring a second pressure of the fluid downstream of the valve (12), and a processing circuit (5) for evaluating the current flow rate as a function of the current position of the moving member (14) and of a pressure value representative of a difference between the second pressure and the first pressure, if the current flow rate cannot be measured by the ultrasonic measurement device (6).

13 Claims, 12 Drawing Sheets

| | $D_1$ [L/h] | $D_2$ [L/h] | $D_3$ [L/h] | $D_4$ [L/h] |
|---|---|---|---|---|
| $T_1$ [°C] | $\Delta TOF_{11}$ | ⋮ | ⋮ | ⋮ |
| $T_2$ [°C] | $\Delta TOF_{21}$ | $\Delta TOF_{22}$ | ⋮ | ⋮ |
| $T_3$ [°C] | $\Delta TOF_{31}$ | $\Delta TOF_{32}$ | $\Delta TOF_{33}$ | |

Fig. 3

|  | $D_1$ [L/h] | $D_2$ [L/h] | $D_3$ [L/h] | $D_4$ [L/h] |
|---|---|---|---|---|
| $\vartheta_1$ [rad] | $\Delta P_{11}$ | ⋮ | ⋮ | ⋮ |
| $\vartheta_2$ [rad] | $\Delta P_{21}$ | $\Delta P_{22}$ | ⋮ | ⋮ |
| $\vartheta_3$ [rad] | $\Delta P_{31}$ | $\Delta P_{32}$ | $\Delta P_{33}$ | ⋮ |

Fig. 7

ULTRASONIC FLUID METER INCORPORATING TWO PRESSURE SENSORS

DESCRIPTION

The invention relates to the field of ultrasonic fluid meters.

BACKGROUND OF THE INVENTION

An ultrasonic fluid meter will most usually comprise a conduit in which the fluid flows, and an ultrasonic measuring device comprising an upstream transducer (on the network side) and a downstream transducer (on the subscriber's installation side). Each transducer acts in succession as an emitter and as a receiver of ultrasonic signals. The upstream transducer therefore emits an ultrasonic signal into the conduit, which is received by the downstream transducer after having travelled in the fluid along a predefined path (of precisely known length). Next, the downstream transducer in turn emits an ultrasonic signal which is received by the upstream transducer after having travelled in the fluid along the predefined path (in the other direction). The ultrasonic measuring device then evaluates the flow rate of the fluid on the basis of the times of flight of the ultrasonic signals between the transducers. Estimating the fluid flow rate makes it possible to evaluate and invoice the quantity of fluid consumed.

In some countries, meters must be capable of limiting, regulating and shutting off the flow rate of fluid. As an example, in some countries and in the case of an unpaid water bill, the water distributor must provide the "bad payer" end-customer with a minimum flow rate for a certain number of days before completely shutting off access to the water.

This minimum flow rate may vary as a function of the country and the customer, and it is therefore necessary to have the possibility of regulating the flow rate "on demand": the flow rate has to be adjusted as a function of a flow rate setpoint.

In order to regulate the flow rate, proposals have been made to integrate a motorized ball valve into the meter conduit. The angular position of the ball can be controlled remotely in order to regulate the flow rate.

However, the dimensions of the meter must be limited, and it may be necessary to position the valve in the flow rate measurement zone, i.e. between the two transducers.

However, when the valve is not open sufficiently, the ultrasonic signals cannot travel in the conduit in the normal manner and follow the predefined path.

It is therefore impossible to measure and regulate the flow rate for certain angular positions of the ball.

OBJECT OF THE INVENTION

The aim of the invention is to be able to measure and regulate the flow rate of fluid irrespective of the state of the valve (open, closed, partially open) in an ultrasonic fluid meter comprising a conduit in which the fluid flows and a valve positioned in the conduit.

SUMMARY OF THE INVENTION

In order to achieve this aim, an ultrasonic fluid meter is provided comprising:
a conduit in which a fluid can flow;
an ultrasonic measurement device comprising two transducers arranged to emit and receive ultrasonic signals in the conduit, the ultrasonic measurement device being arranged to evaluate a current flow rate of the fluid from the time of flight of the ultrasonic signals between the transducers;
a valve positioned along a length of the conduit between the two transducers, the valve comprising a movable member (14) which extends in the conduit and for which a current position can be regulated in order to control the current flow rate of the fluid;
a position sensor configured to measure the current position of the movable member;
a first pressure sensor arranged to measure a first pressure of the fluid in the conduit upstream from the valve and a second pressure sensor arranged to measure a second pressure of the fluid in the conduit downstream from the valve;
a processing circuit arranged, if the current position of the movable member is such that the current flow rate cannot be measured by the ultrasonic measurement device, to evaluate the current flow rate as a function of the current position of the movable member and of a pressure value representative of a difference between the second pressure and the first pressure.

The ultrasonic fluid meter according to the invention is therefore particularly advantageous because, when the current position of the movable member of the valve is such that the current flow rate cannot be measured via the ultrasonic measuring device, then the current flow rate is evaluated as a function of the current position of the movable member and of a pressure value which is calculated on the basis of at least one measurement of the first pressure produced by the first pressure sensor and of at least one measurement of the second pressure produced by the second pressure sensor. In this case, the ultrasonic fluid meter in accordance with the invention does not require the ultrasonic measuring device in order to be operative.

On the contrary, when the current position of the movable member of the valve is such that the current flow rate can be measured via the ultrasonic measurement device, then the current flow rate is simply evaluated from said ultrasonic measurement device.

The ultrasonic fluid meter in accordance with the invention is therefore capable of measuring and regulating the flow rate of the fluid irrespective of the state of the valve (open, closed, partially open).

In one embodiment, the processing circuit is configured, if the current position of the movable member is such that the current flow rate can be measured by the ultrasonic measuring device, to:
evaluate a pressure of the fluid at zero flow rate; estimate the temperature of the fluid by using the pressure of the fluid at zero flow rate;
produce a first flow rate value from the time of flight of the ultrasonic signals between the transducers and from the temperature of the fluid.

In one embodiment, the processing circuit is furthermore configured to:
produce a second flow rate value from the current position of the movable member and from the pressure value;
produce a consolidated flow rate value from the first flow rate value and from the second flow rate value.

In one embodiment, in order to evaluate the pressure of the fluid at zero flow rate, the processing circuit is configured to:
wait until the current flow rate becomes zero;
then acquire at least one measurement of the first pressure produced by the first pressure sensor or a measurement of the second pressure produced by the second pressure sensor.

In one embodiment, the fluid is a compressible fluid, the fluid meter further comprising a temperature sensor configured to measure a temperature of the fluid in the conduit, the processing circuit being configured such that, if the current position of the movable member is such that the current flow cannot be measured by the ultrasonic measuring device, it also uses the temperature of the fluid to evaluate the current flow rate.

In one embodiment, the valve is a ball valve.

A method for measuring a current flow rate of a fluid is also provided, carried out in the processing circuit of an ultrasonic fluid meter as described above, and, if the current position of the movable member is such that the current flow rate cannot be measured by the ultrasonic measuring device, comprising the step of evaluating the current flow rate as a function of the current position of the movable member and of the pressure value which is representative of the difference between the second pressure and the first pressure.

In one embodiment, if the current position of the movable member is such that the current flow rate can be measured by the ultrasonic measuring device, the measurement method as described above comprises the steps of
  using the ultrasonic measuring device to measure the current flow rate.
  waiting until the current flow rate becomes zero;
  then acquiring at least one measurement of the first pressure produced by the first pressure sensor or at least one measurement of the second pressure produced by the second pressure sensor, and thus evaluating the pressure of the fluid at zero flow rate;
  estimating the temperature of the fluid by using the pressure of the fluid at zero flow rate;
  estimating a first flow rate value from the time of flight of the ultrasonic signals between the transducers and from the temperature of the fluid.

In one embodiment, the measurement method as described above further comprises the steps of:
  producing a second flow rate value from the current position of the movable member and from the pressure value;
  produce a consolidated flow rate value from the first flow rate value and from the second flow rate value.

In one embodiment, the measurement method as described above further comprises the steps of:
  defining a time interval between a time t1 and a time t2, such that at time t1, a difference between the second pressure and the first pressure changes from a zero value to a value which is higher than a predefined threshold, and at time t2, the difference between the second pressure and the first pressure changes from a second value which is higher than the predefined threshold to the zero value,
  integrating the current flow rate over the time interval and thus evaluating a volume of fluid distributed via the conduit.

In addition, a computer program is provided, comprising instructions which cause the processing circuit of the meter as described above to execute the steps of the detection method as described above.

There is also provided a computer-readable storage medium, storing the above-described computer program.

In addition, a method for regulating a current flow rate is proposed, which is carried out in the processing circuit of an ultrasonic Fluid meter as described above and comprising the steps of:
  acquiring a flow rate setpoint;
  estimating the current flow rate using the measurement method as described above;
  adapting the current position of the movable member as a function of a difference between the flow rate setpoint and the current flow rate.

A computer program is also provided which comprises instructions which cause the processing circuit of the meter as described above to execute the steps of the regulation method as described above.

There is also provided a computer-readable storage medium, storing the above-described computer program.

The invention will be best understood in the light of the following description of particular non-limiting embodiments of the invention.

BRIEF DESCRIPTION OF THE DRAWING

Reference will be made to the accompanying drawings, among which:

FIG. 3 shows a table for a second reference table;

FIG. 7 shows a table for a third reference table;

DETAILED DESCRIPTION OF THE INVENTION

Figure 1:
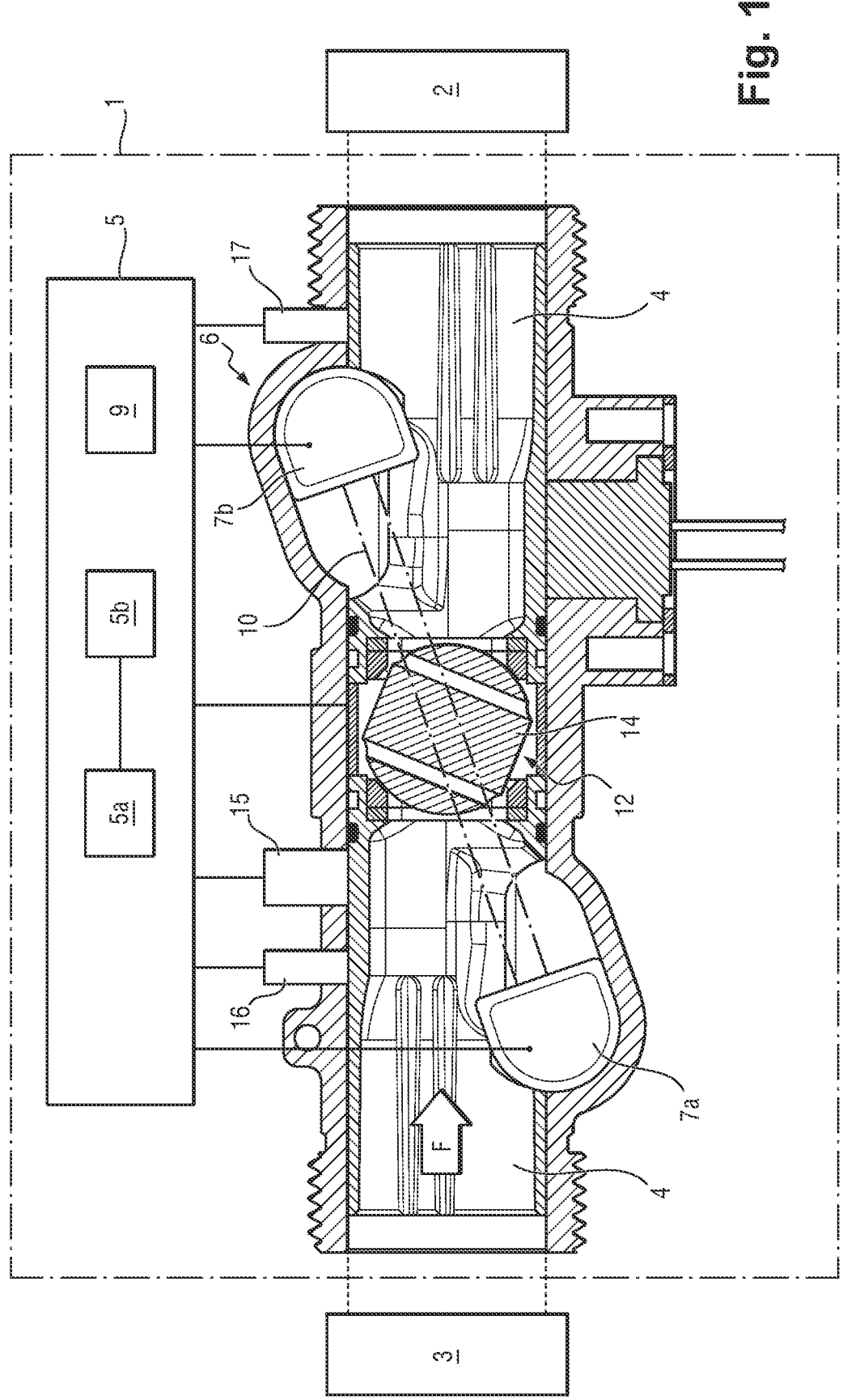
FIG. 1 shows an ultrasonic fluid meter in accordance with a first embodiment of the invention.
Figure 2:
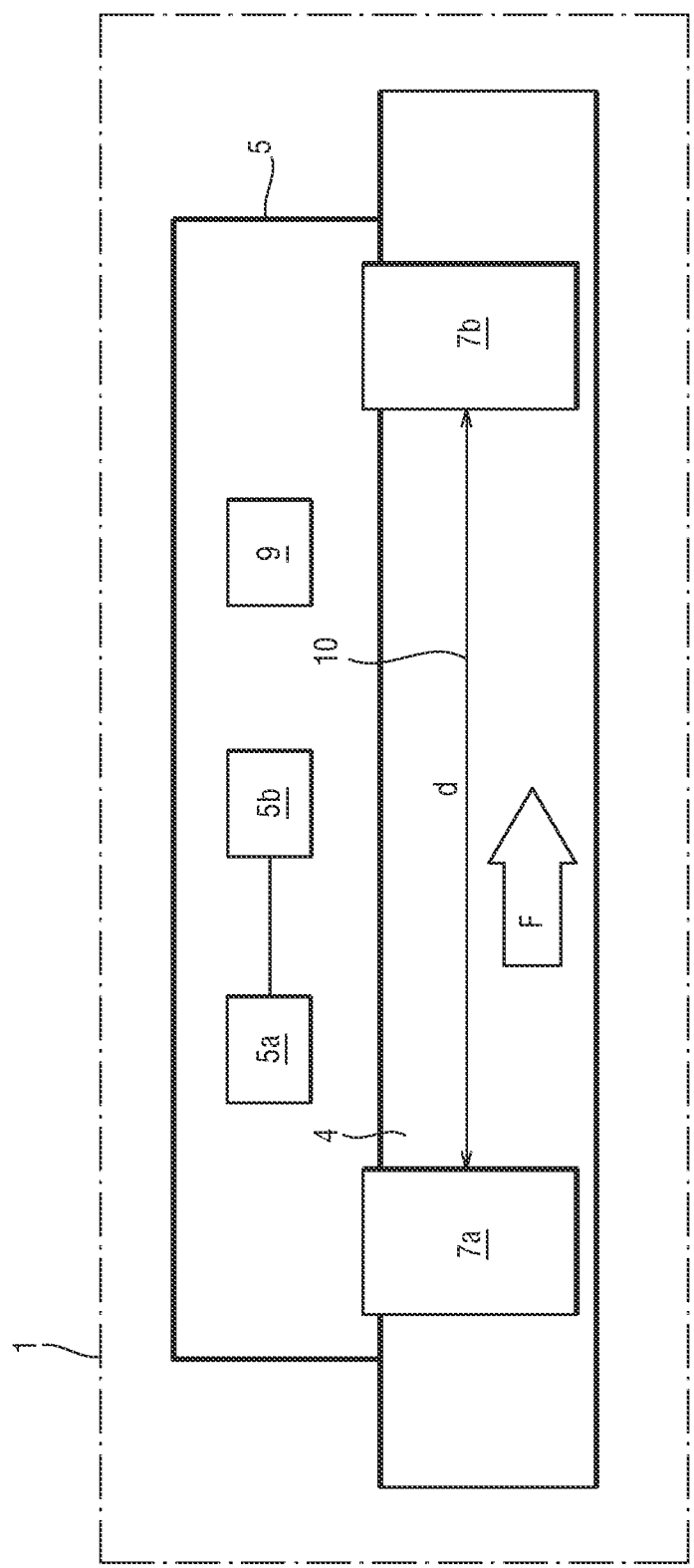
FIG. 2 diagrammatically shows two transducers in the conduit.

With reference to FIGS. 1 and 2, the invention is embodied in an ultrasonic water meter 1. Here, the meter 1 a water meter which is used to measure the water consumption of an installation 2 of a subscriber. The water is supplied to the installation 2 of the subscriber by a water distribution network 3.

The meter 1 comprises a conduit 4 in which the water supplied by the network 3 to the installation 2 flows. The water flows in the conduit 4 from upstream to downstream, as indicated by the direction of the arrow F. Here, the term "upstream" means on the side of the network 3, and the term "downstream" means on the side of the installation 2.

The meter 1 comprises a processing circuit 5. The processing circuit 5 comprises at least one processing component 5a which, for example, is a "general-purpose" processor, a processor specialized in signal processing (or digital signal processor (DSP)), a microcontroller, or in fact a programmable logic circuit such as a FPGA (or field programmable gate array) or an ASIC (or application-specific integrated circuit). The processing circuit 5 also comprises one or more memories Sb which are connected to or integrated into the processing component 5. At least one of these memories forms a computer-readable storage support on which at least one computer program comprising instructions which cause the processing component to execute at least some of the steps of the measurement method and the regulation method, which will be described below, are stored.

The meter 1 also comprises an ultrasonic measuring device 6. The ultrasonic measuring device 6 is used "by default" in order to measure the flow rate of water supplied to the installation 2 by the network 3.

The ultrasonic measuring device 6 includes an upstream transducer 7a and a downstream transducer 7b. The ultrasonic measuring device 6 also includes a measurement module 9 connected to the upstream transducer 7a and to the downstream transducer 7b. Here, the processing module 9 is implemented. in the processing circuit 5.

The upstream transducer 7a and the downstream transducer 7b are (but not necessarily) paired. In this example, the upstream transducer 7a and the downstream transducer 7b are piezoelectric transducers.

Each transducer 7a, 7b acts in succession as an emitter and a receiver of ultrasonic signals.

The processor module 9 generates an electrical excitation signal and delivers the electrical excitation signal to the emitter. The emitter then generates an ultrasonic signal. The receiver receives the ultrasonic signal after it has travelled in the fluid along a predefined path 10, and the processing module 9 measures the time of flight.

The predefined path 10 here is a straight path. (inclined with respect to a longitudinal axis of the conduit 4, as is the case in FIG. 1, or parallel to said axis, as is the case in FIG. 2). The predefined path 10 has a length d, which is very precisely known.

Thus, firstly, the upstream transducer 7a emits the ultrasonic signal which is received by the downstream transducer 7b. The processing module 9 measures the time of flight from upstream to downstream, $TOF_{up}$.

Next, the downstream transducer 7b emits the ultrasonic measurement, signal which is received by the upstream transducer 7a. The processing module 9 measures the time of flight from downstream to upstream, $TOF_{DN}$.

We have:

$$TOF_{UP} = \frac{d}{c - v_{fluid}}$$

$$TOF_{DN} = \frac{d}{c + v_{fluid}}$$

where c is the speed of sound in water, d is the length of the predefined, path 10, and $v_{fluid}$ is the speed of flow of the water.

We now define $\Delta_{TOF}$ and $\Sigma_{TOF}$:

$$\Delta_{TOF} = TOF_{DN} - TOF_{UP}$$

$$\Sigma_{TOF} = TOF_{DN} + TOF_{UP}$$

The processing module 9 calculates the speed of sound via the mean of the two times of flight (outward and return), which is independent of the flow of the fluid:

$$c = \frac{2d}{\Sigma_{TOF}}$$

The processing module 9 calculates the speed of flow of the water as follows:

$$v_{fluid} = \frac{1}{2} \cdot \left( \frac{d}{TOF_{UP}} - \frac{d}{TOF_{DN}} \right)$$

$$v_{fluid} = \frac{d}{2} \cdot \frac{TOF_{DN} - TOF_{UP}}{TOF_{UP} \cdot TOF_{DN}}$$

$$v_{fluid} \approx 2d \cdot \frac{\Delta_{TOF}}{\Sigma_{TOF}^2}$$

The temperature is calculated from the speed of sound, for example via a polynomial approximation, without taking into account the pressure if this is not measured:

$$T = \sum_{i=0}^{N} a_i \times c^i$$

From these data, the flow rate Q of the water is calculated as follows:

$$Q = K_T \cdot v = K_T \cdot \frac{\Delta_{TOF}}{(\Sigma_{TOF})^2} = K_T \cdot \frac{\Delta_{TOF}}{2d} \cdot c^2$$

The factor $K_T$, is homogeneous at a surface and, inter alia, is correlated with the section of the conduit 4. The factor $K_T$ is derived from a first reference table, as a function of the temperature of the water. The first reference table is stored in a memory of the processing circuit 5. For a measured $\Delta_{TOF}$, the temperature is calculated via the speed of sound. Next, the $K_T$ is obtained via the first reference table as a function of the previously calculated temperature.

With reference to FIG. 3, in order to limit the complex calculations (and therefore the calculation time and the energy consumption), it is possible to use a second reference table 11 in order to estimate the flow rate of the water. By way of example, this second reference table 11 is in two dimensions: temperature vs flow rate. The second reference table 11 is stored in a memory 5b of the processing circuit 5.

Here, the second reference table 11 comprises a single table.

As an example, if the temperature is equal to $T_1$, and if $\Delta_{TOF}$ is equal to $\Delta TOF_{11}$, the processing module 9 will deduce therefrom that the flow rate is equal to $D_1$.

The meter 1 also comprises a valve 12 which makes it possible to regulate, limit or shut off the flow of water. The valve 12 can be seen in FIG. 1, but is not shown in FIG. 2.

The valve 12 is positioned between the two transducers 7a, 7b along a length of the conduit 4.

The valve 12 is a motorized (electromechanical) multi-position valve. The valve 12 comprises a movable member which extends in the conduit 4 and for which a current position can be regulated in order to control the current flow rate of the fluid. Here, the valve 12 is a ball valve and the movable member is therefore a ball 14; the current position of the ball 14 is an angular position.

The counter 1 also comprises a position sensor 15 configured to measure the current position of the ball 14.

The meter 1 additionally comprises communication means which can be used to implement any type of communication, for example communications via a 2G, 3G, 4G, Cat-M or NB-IOT cellular network, communications in accordance with the LoRa protocol, radio communications in accordance with the Wize standard operating at a frequency of 169 MHz, etc.

The communication means in particular enable the processing circuit 5 to receive a flow rate setpoint from outside. As an example, the flow rate setpoint is transmitted by an information system (IS) of the water supplier or the network manager, possibly via a data concentrator.

The processing circuit 5 acquires the flow rate setpoint, the current position of the ball 14 (measured by the position sensor 15), and can therefore regulate the current flow rate by modifying the angular position of the ball 14 if necessary. It should be noted that the processing circuit 5 is also capable of controlling the valve 12 autonomously (i.e. without receiving a setpoint from outside). It should also be noted that the valve 12 could be managed via a different setpoint, for example via an angular position setpoint for the ball 14.

The meter 1 comprises a first pressure sensor 16 and a second sensor pressure 17. The first pressure sensor 16 is here positioned in the conduit 4 upstream from the valve 12, approximately facing the upstream transducer 7a. The second pressure sensor 17 is positioned here in the conduit 4 downstream from the valve 12, close to the downstream transducer 7b.

The first pressure sensor 16 makes it possible to measure a first pressure P1 equal to the instantaneous Pressure of the fluid in the conduit 4 upstream from the valve 12. The second pressure sensor 17 makes it possible to measure a second pressure P2 equal to the instantaneous pressure of the fluid in the conduit 4 downstream from the valve 12.

As was shown above, the ultrasonic measuring device is used by default to measure the current flow rate.

However, when the valve 12 is not sufficiently open (i.e. for certain angular positions of the ball 14), there is a possibility that the ball 14 will prevent the ultrasonic signals from travelling between the transducers 7a, 7b: the valve 12 obstructs the ultrasound field and the water flow rate cannot then be measured by the ultrasonic measuring device 6. Under such circumstances, the processing circuit 5 uses the first pressure sensor 16 and the second pressure sensor 17 to measure the current flow rate of the water in the conduit 4.

Specifically, the valve 12 acts as a pressure-reducing device, amplifying the load drop between its inlet and its outlet.

Thus, the current flow rate Q (in litres/hour) is expressed on the basis of a pressure value AP which is representative of a difference between the second pressure P2 and the first pressure P1.

Here, the pressure value AP is equal to the difference between the second pressure P2 and the first pressure P1: ΔP =P2–P2–P1.

We have:

$$Q = K \times \sqrt{\Delta P}$$

K is a factor related to the speed of the fluid flow, the temperature, the geometry of the conduit, etc.

When the valve 12 is open or partially open and the current flow rate is zero, the pressure is identical on either side of the valve 12, P1=P2, and therefore the pressure value AP is zero. The first measured pressure P1 and the second measured pressure P2 are then both equal to the pressure of the fluid at zero flow rate or static pressure of the network.

For a given static pressure of the network with the valve closed, opening the valve will cause the pressure to vary (drop): there will be a difference between the pressure at zero flow rate and the pressure with a flow rate.

Figure 4:
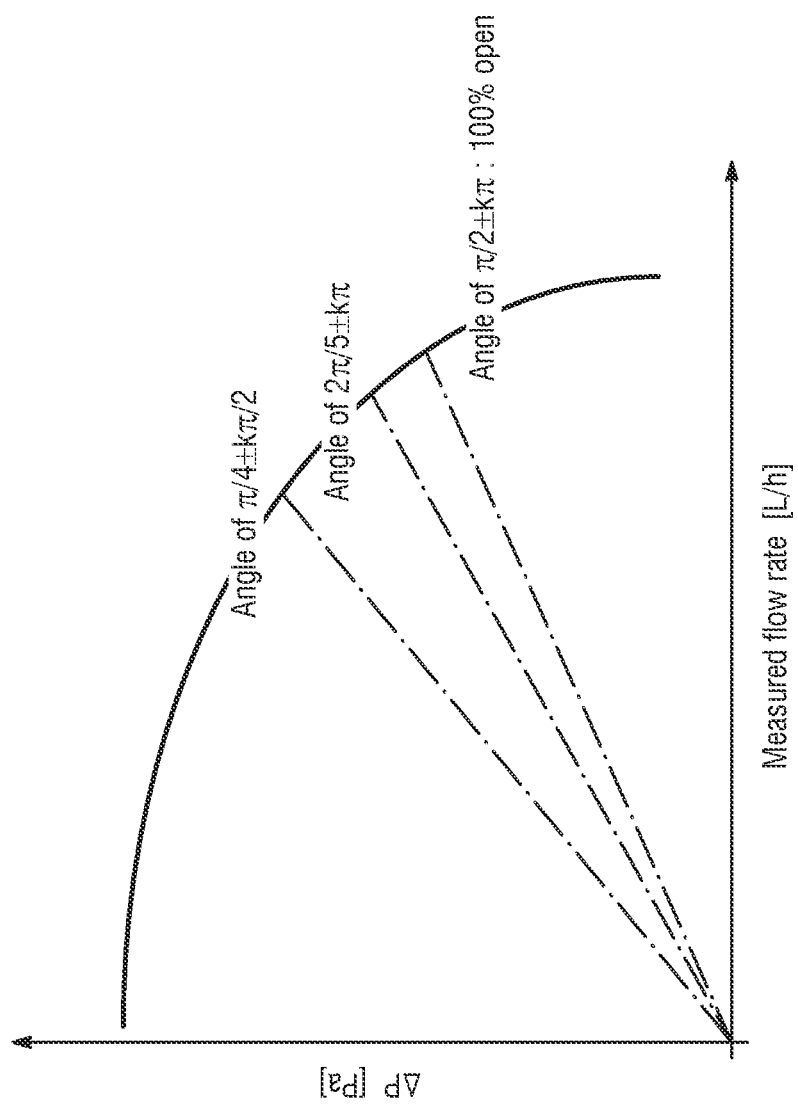
FIG. 4 shows a graph comprising a plot for the value of the pressure P as a function of the current flow rate.

The change in section (conduit, valve, etc.) generates variations in speed and therefore in pressure. The pressure value ΔP=P2–P1 is therefore a reflection of the current flow rate. FIG. 4 graphically shows the variation in the pressure value AP as a function of the current flow rate, showing particular values for the current position (angular position) of the ball 14:

$$\frac{\pi}{2} + k\pi, \ \frac{2\pi}{5} + k\pi, \ \frac{\pi}{4} + k\frac{\pi}{2},$$

where k is a relative integer.

When the valve 12 is closed (the state of the valve must be known), the current flow rate is zero, but the pressure value ΔP may be non-zero. The first measured pressure P1 is then equal to the pressure of the fluid at zero flow rate (static pressure of the network) and the second measured pressure P2 is then equal to the pressure between the valve 12 and the installation 2.

When the current position of the ball 14 is such that the current flow rate cannot be measured by the ultrasonic measuring device 6, i.e. when the valve 12 is in a semi-open position and ultrasonic measurement is impossible, the processing circuit 5 evaluates the current flow rate as a function of the current angular position of the ball 14 and the pressure value ΔP.

Figure 5:
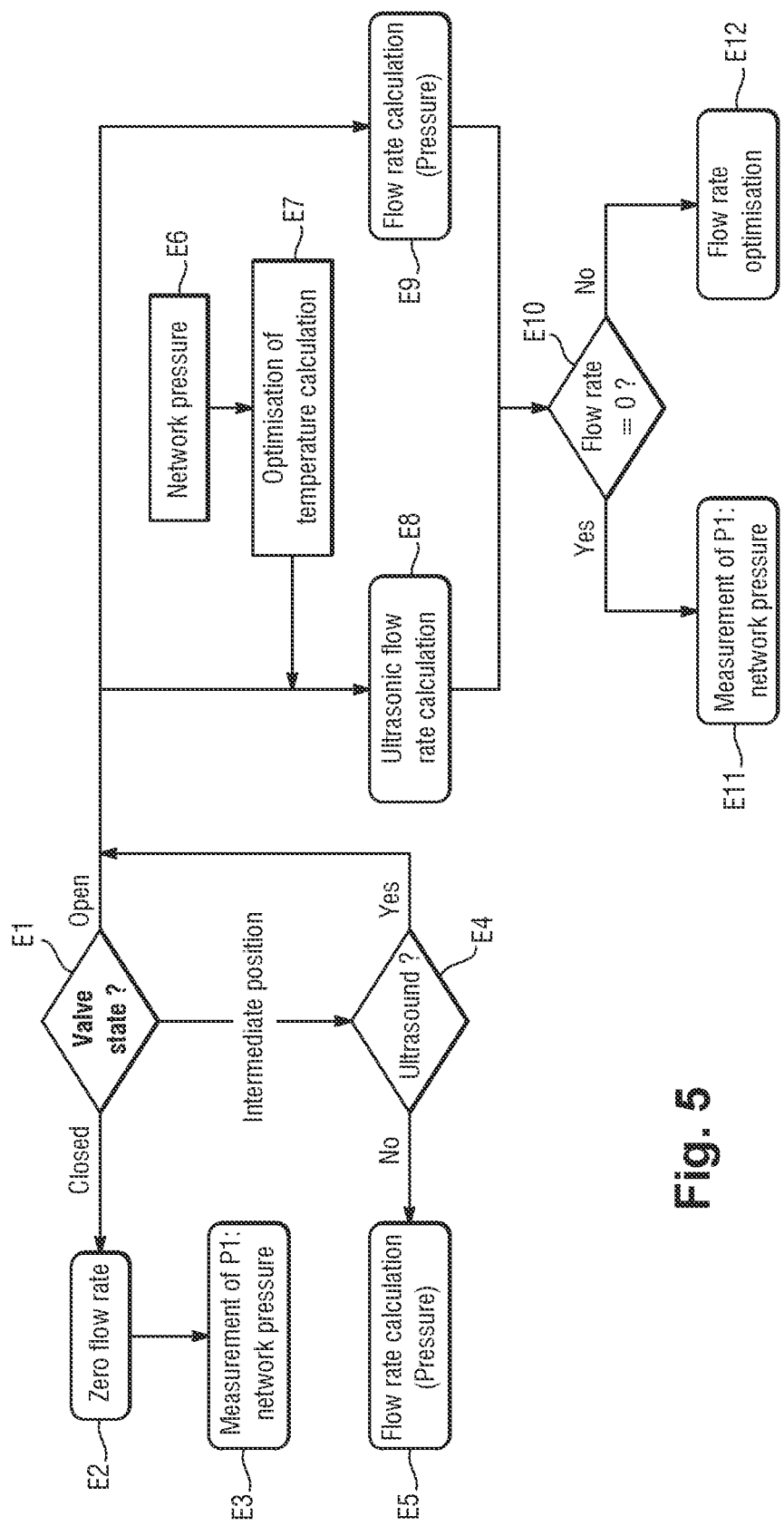
FIG. 5 shows the steps of a measurement method.

Referring now to FIG. 5, a more detailed description of the measurement method implemented by the processing circuit 5 in this case will now be described.

Firstly, the processing circuit 5 acquires the current angular position of the ball 14 via the position sensor 15 (step E1).

If the valve 12 is closed, the processing circuit 5 acquires at least one measurement for the first pressure P1 produced via the first pressure sensor 16 (step E2), and thus evaluates the water pressure at zero flow rate (step E3), i.e. the network pressure.

If the valve 12 is partially open, the processing circuit 5 verifies whether the ultrasonic signals can travel freely between the transducers 7a, 7b, and therefore whether the current position of the ball 14 is such that the current flow rate can or cannot be measured by the ultrasonic measuring device 6 (step E4). If this is not the case, the processing circuit 5 evaluates the current flow rate as a function of the current angular position of the ball 14 and of the pressure value ΔP=P2–P1 (step E5).

Figure 6:
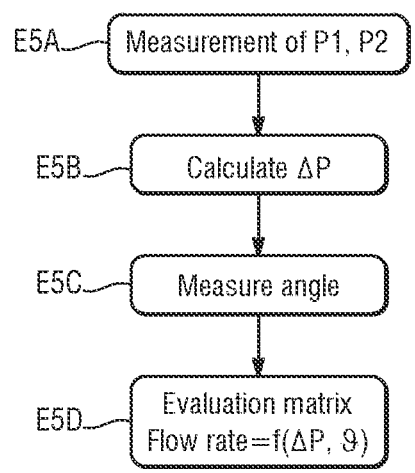
FIG. 6 shows the steps of a measurement method starting from the pressure value $\Delta P$.

With reference to FIG. 6, step E5 is described in greater detail. The processing circuit 5 therefore acquires at least one measurement of the first pressure P1 produced by the first pressure sensor 16 and at least one value of the second pressure P2 produced by the second pressure sensor 17 (step 5A).

Subsequently, the processing circuit 5 calculates the pressure value ΔP=P2–P1 (step 5B).

Preferably, the processing circuit 5 acquires the current angular position of the ball 14 again via the position sensor 15 (step 5C).

In order to estimate the current flow rate, the processing circuit 5 then uses a third reference table 18 which is stored in a memory 5b of the processing circuit 5 (step 5D).

With reference to FIG. 7, the third reference table 18 is for example in two dimensions, 2D: pressure value ΔP as a function of the current angular position of the ball 14 and the flow rate.

As an example, if the current angular position of the ball 14 is $\theta = \theta_3$, and $\Delta P = P - P1 = \Delta P_{31}$, the processing circuit 5 estimates that the current flow rate is equal to $D_1$. Conversely, the processing circuit 5 can estimate the necessary angular position for the ball 14 as a function of a pressure value ΔP and of a desired flow rate.

We now return to FIG. 5 and, more particularly, to step E4 of the measurement method.

If the valve 12 is partially open and the ultrasonic signals can travel freely between the transducers 7a, 7b, or if the valve 12 is (completely) open, then the current angular position of the ball 14 is such that the current flow rate can be measured by the ultrasonic measuring device 6.

The processing circuit therefore uses the ultrasonic measuring device 6 to measure the flow rate (step E8).

Advantageously, when the processing circuit 5 uses the ultrasonic measuring device 6 to measure the current flow rate, the processing circuit 5 can consolidate the measurement of the current flow rate, produced by the ultrasonic measuring device 6, by using the water pressure.

As was discussed above, the ultrasonic measuring device 6 uses the ultrasonic signals to calculate the speed of sound in water and the speed of flow of water in the conduit 4. In fact, the difference between the outward and return times for the ultrasonic signals reflects the velocity of the flow. The sum of the outward and return times reflects the temperature of the water.

In order to obtain a very accurate measurement of the flow rate, it is therefore preferable to know the temperature, the speed of sound in the water, and the pressure of the water in the conduit 4.

In general, the pressure is considered to be negligible.

However, the speed of sound in water (as in any fluid) is a function of the temperature and the pressure, inter alia.

Thus, at constant temperature T, the speed c(T,P) of sound in water varies as a function of the pressure P as indicated in the equation of Belogol'skii et al's equation:

$$c(T,P) = c(T,0) + M_1(T)(P - 0.101325) + M_2(T)(P - 0.101325)^2 + M_3(T)(P - 0.101325)^3$$

$$c(t,0) = a_{00} + a_{10}T + a_{20}T^2 + a_{30}T^3 + a_{40}T^4 + a_{50}T^5$$

$$M_1(T) = a_{01} + a_{11}T + a_{21}T^2 + a_{31}T^3$$

$$M_2(T) = a_{02} + a_{12}T + a_{22}T^2 + a_{32}T^3$$

$$M_3(T) = a_{03} + a_{13}T + a_{23}T^2 + a_{33}T^3$$

The coefficients $a_{00}$, $a_{10}$, $a_{20}$, etc. are provided in the appendix to the present description.

Figure 8:
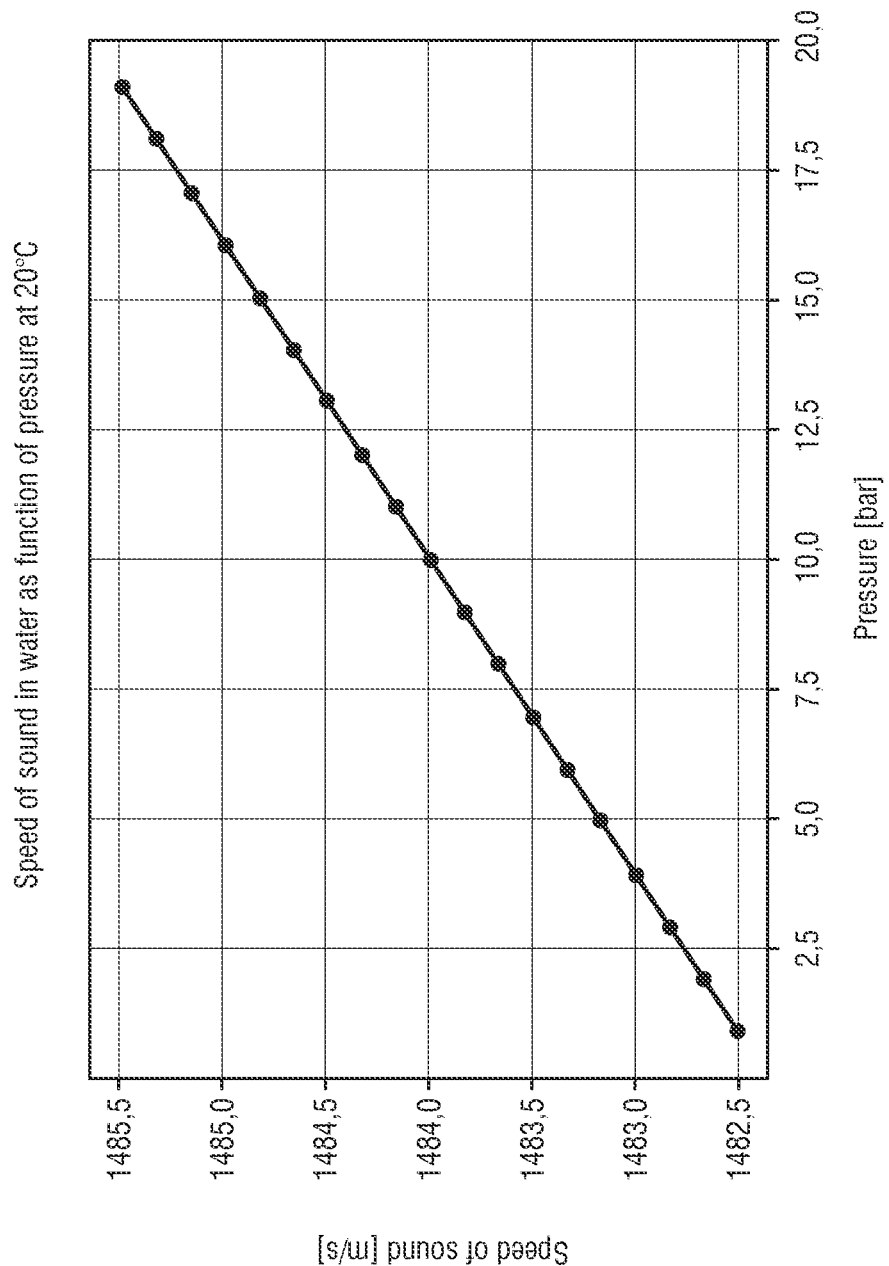
FIG. 8 shows a graph comprising a plot of the speed of sound in water as a function of pressure at 20°C.

It can be seen in FIG. 8 that the speed of sound in water varies as a function of the pressure.

Thus, at 20° C., between a medium at 1 bar and a medium at 16 bar (maximum pressure of a residential water network), the speed of sound will vary from 1482.5 ms to 1484.99 m/s (difference of 2.48 m/s). This difference corresponds to a temperature difference of 0.82°C.

This difference may introduce an error into the calculation of the flow rate via the second reference table 11 (FIG. 3).

It is therefore advantageous to take the pressure during calibration and during measurement into consideration in order to improve the characterization of the medium and the calculation of the flow rate.

It is then possible to replace the second reference table 11 with a three-dimensional table which comprises a table similar to the table in FIG. 3 for different predefined pressure values.

In the case in which the pressure of the fluid at zero flow rate (static pressure of the network) has riot been measured previously in step E3, the processing circuit 5 can wait until the current flow rate is zero.

When the current flow rate is zero, the processing circuit 5 acquires at least one value for the first pressure P1 produced via the first pressure sensor 7a or at least one value for the second pressure P2 produced via the second pressure sensor 7b, and thus evaluates the pressure of the fluid at zero flow rate (step E6).

The processing circuit 5 then uses the speed of sound in water and the pressure of the fluid at zero flow rate to accurately estimate the temperature of the fluid. (step E7).

It has just been seen that, if the state of the valve 12 is such that the ultrasonic measuring device 6 can be used, the processing circuit 5 uses said device to measure the current flow rate.

Advantageously, if the ultrasonic measuring device 6 can be used, the processing circuit 5 uses the ultrasonic measuring device 6 to measure a first flow rate value (step E8) and also uses the first pressure sensor 16 and the second pressure sensor to measure a second flow rate value (step E9). The processing circuit 5 also uses the first pressure sensor 16 and the second pressure sensor 17 to measure the second flow rate value (step E9). To this end, the processing circuit 5 carries out the steps E5A, E5B, E5C and E5D in succession.

The processing circuit 5 checks whether the first flow rate value and/or the second flow rate value are zero (step E10).

If this is the case (zero current flow rate), the processing circuit 5 then acquires at least one measurement for the first pressure P1 produced via the first pressure sensor 16 or at least one measurement for the second pressure P2 produced via the second pressure sensor 17, and therefore evaluates the pressure of the water at zero flow rate (step 11), i.e. the pressure of the network.

If this is not the case (non-zero current flow rate), the processing circuit 5 produces a consolidated flow rate value from the first flow rate value (measured via the ultrasonic measuring device 6) and from the second flow rate value (measured from the first pressure sensor 16 and the second pressure sensor 17) (step E12). Preferably, the consolidated flow rate value is an arithmetic mean value of the first flow rate value and the second flow rate value. The consolidated flow rate value could be another type of digital value, for example, the consolidated Flow rate value may be a weighted mean value of the first flow rate value and the second flow rate value.

If necessary, the processing circuit 5 may also regulate the current flow rate.

Figure 9:
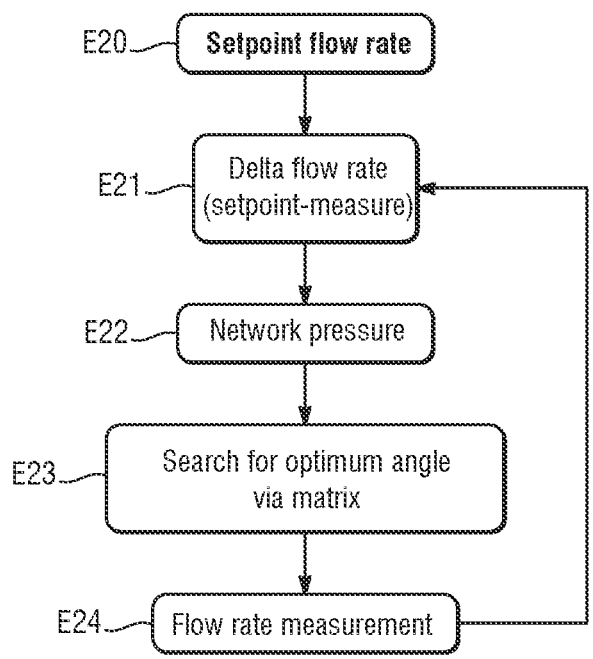
FIG. 9 shows the steps in a regulation method.

To this end, referring now to FIG. 9, the processing circuit 5 acquires a flow rate setpoint (step E20).

The processing circuit 5 then measures the current flow rate using the measurement method which has just been described, then calculates the difference between the flow rate setpoint and the current flow rate (step E21).

The processing circuit 5 then adapts the current position of the ball 14 as a function of this difference.

To this end, the processing circuit 5 acquires the pressure of the fluid at zero flow rate (static pressure of the network previously measured via the measurement method) —step E22, then determines, in the third reference table 18, the optimum angular position of the ball 14 which makes it possible to confer on the current flow rate the value for the flow rate setpoint (step E23).

The processing circuit 5 then regulates the valve 12 to bring the ball 14 into the optimum angular position.

The processing circuit 5 then measures the current flow rate again. (step E2), and the regulation method goes back to step E21. The servo-control continues until a negligible difference between the current flow rate and the flow rate setpoint is obtained.

Advantageously, the processing circuit 5 can use the first pressure sensor 16 and the second pressure sensor 17 to evaluate the volume of water dispensed via the conduit 4.

In fact, in the presence of a flow rate, the value for the pressure $\Delta P$ will vary.

Figure 10:
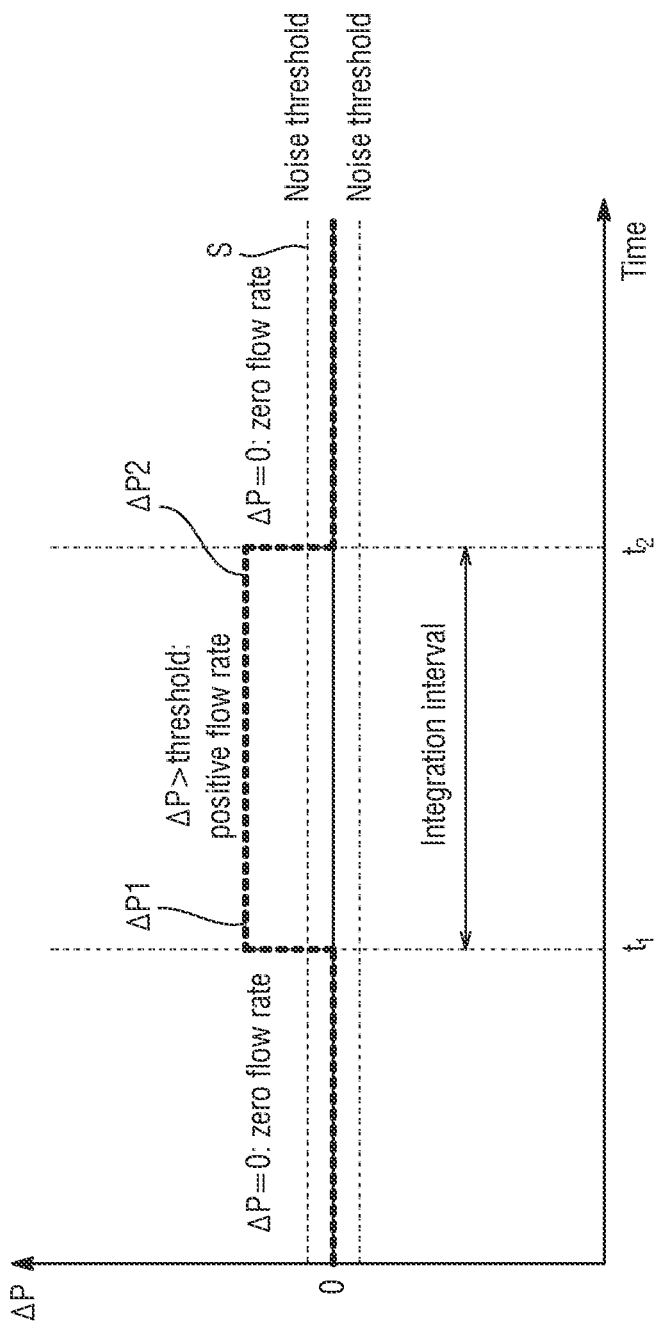
FIG. 10 shows a graph in which the change in the pressure measured in the conduit when the installation starts and then stops consuming water is shown.

To this end, with reference to FIG. 10, the processing circuit 5 detects a time interval which extends between a time t1 and a time t2 such that:

- at time t1, the pressure value $\Delta P$ changes from a zero value to a first value $\Delta P_1$ which is higher than a predefined threshold S. The predefined threshold S is here a noise threshold due to measurement noise obtained via the first pressure sensor 16 and the second pressure sensor 17
- at time t2, the pressure value $\Delta P$ changes from a second value $\Delta P_2$ which is higher than the threshold S (here, it should be noted that the second value $\Delta P_2$ is equal to the first value $\Delta P_1$) to a zero value.

The accuracy of this time interval [t1, t2] depends on the measurement frequency of the first pressure sensor 16 and of the second pressure sensor 17.

The processing circuit 5 then integrates the current flow rate over the time interval [t1; t2] in order to calculate the volume consumed:

$$\text{Volume} = \int_{t1}^{t2} Q \cdot dt,$$

where Q is the current flow rate (in litres/hour).

It should be noted that the invention may clearly be carried out in a fluid meter other than a water meter. The fluid may in particular be a compressible fluid (for example a gas).

Figure 11:
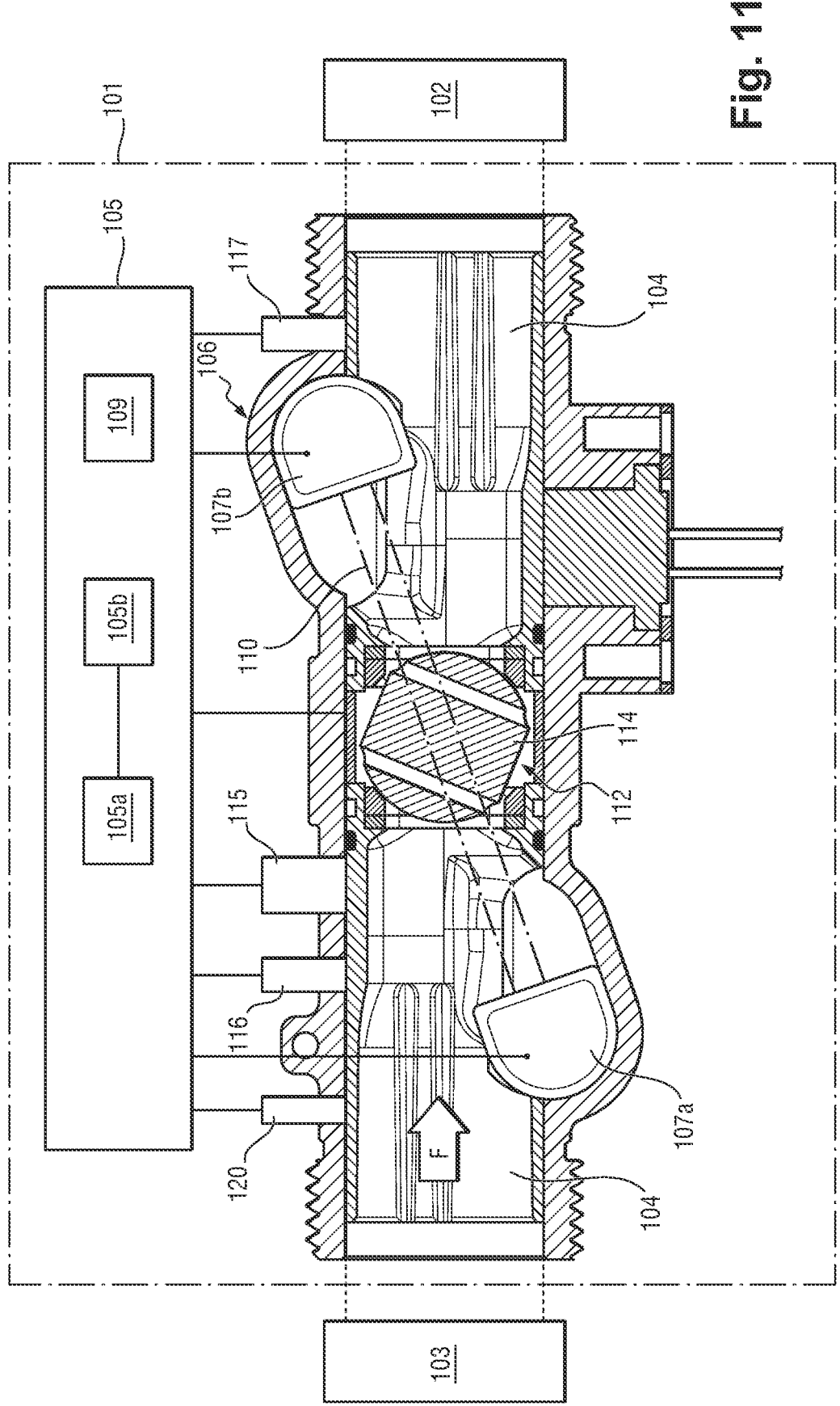
FIG. 11 shows an ultrasonic fluid meter in accordance with a second embodiment of the invention.

In this case, advantageously, with reference to FIG. 11, the ultrasonic fluid meter 101 in accordance with a second embodiment of the invention comprises a temperature sensor 120 for the fluid. Here, the temperature sensor 120 is located upstream of the first pressure sensor 116. It should be noted that the references of FIG. 11 are those of FIG. 1 increased by the value 100.

In the case of a compressible fluid, it is in fact impossible to correlate the pressure drop with the flow rate without knowing the temperature.

Specifically, it is known that:

$$P.V=n.R.T,$$

in which:

P: pressure (Pa);

V: Volume (m3);

n: quantity of material (mol);

R: ideal gas constant (~8,314 J/K/mol);

T: absolute temperature (K).

At a given temperature, we have:

$$Q=K\times\sqrt{\Delta P},$$

in which:

$\Delta P$: pressure drop;

Q: flow rate, in litres per hour.

According to Gay-Lussac's law, at constant volume, the pressure of a certain quantity of gas is directly Proportional to its absolute temperature ($P \propto T$):

$$\frac{P1}{T1} = \frac{P2}{T2}$$

Consequently, a variation in pressure may be due to a variation in the flow rate or to a variation in temperature, whence the importance of knowing the absolute temperature in order to be able to correlate the flow rate with the pressure drop. It is therefore necessary to integrate a temperature sensor in the case of gases and to carry out the measurements at constant temperature (if there is only one temperature sensor).

The processing circuit 105 therefore uses a fourth reference table which is in four dimensions. By way of example, this fourth reference table corresponds to the third reference table 18 to which a fourth dimension corresponding to temperature is added.

Naturally, the invention is not limited to the described embodiments, but covers any variant coming within the scope of the invention as defined by the claims.

Clearly, the invention is of application irrespective of the positioning and the configuration of the upstream transducer and the downstream transducer. The ultrasonic signals can be emitted at any angle of orientation with respect to a longitudinal axis of the conduit.

Figure 12:
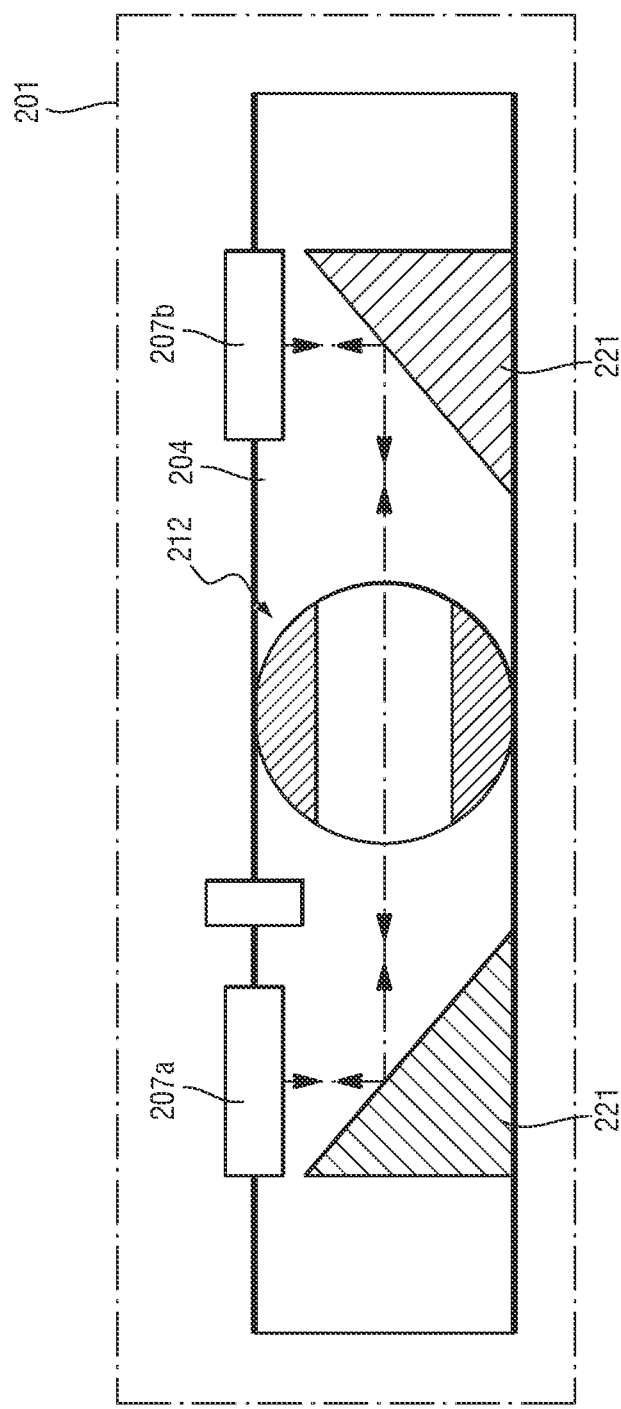
FIG. 12 shows an ultrasonic fluid meter in accordance with a third embodiment of the invention.

The predefined path between the transducers does not necessarily need to be a straight path. FIG. 12 shows an ultrasonic fluid meter 201 in accordance with a third embodiment 201. The ball valve 212 is in the open position. The ultrasonic signals in the conduit 204 emitted and received by the transducers 207a, 207b are reflected by reflectors 221, for example mirrors orientated at 45°.

Clearly, the invention does not apply solely to a water meter, but applies to any meter for any fluid: gas, petroleum, oil, medicine, etc.

The valve does not necessarily need to be a ball valve. Any type of valve may be used to regulate the flow rate, for example a slide valve. The position of the movable member, making it possble to regulate the flow rate, is not necessarily an angular position, but may be an axial position.

The pressure sensor need not necessarily be positioned upstream from the valve, but could be positioned downstream therefrom. However, in this case, the measured pressure, when the valve is completely closed, does not correspond to the pressure of the network.

Appendix: The table below contains the coefficients used in Belogol'skii et al's equation.

| | |
|---|---|
| $a_{00}$ | 1402.38744 |
| $a_{10}$ | 5.03836171 |
| $a_{20}$ | $-5.81172916 \times 10^{-2}$ |
| $a_{30}$ | $3.34638117 \times 10^{-4}$ |
| $a_{40}$ | $-1.48259672 \times 10^{-6}$ |
| $a_{50}$ | $3.16585020 \times 10^{-9}$ |
| $a_{01}$ | 1.49043589 |
| $a_{11}$ | $1.077850609 \times 10^{-2}$ |
| $a_{21}$ | $-2.232794656 \times 10^{-4}$ |
| $a_{31}$ | $2.718246452 \times 10^{-6}$ |
| $a_{02}$ | $4.31532833 \times 10^{-3}$ |
| $a_{12}$ | $-2.938590293 \times 10^{-4}$ |
| $a_{22}$ | $6.822485943 \times 10^{-6}$ |
| $a_{32}$ | $-6.674551162 \times 10^{-8}$ |
| $a_{03}$ | $-1.852993525 \times 10^{-5}$ |
| $a_{13}$ | $1.481844713 \times 10^{-6}$ |
| $a_{23}$ | $-3.940994021 \times 10^{-8}$ |
| $a_{33}$ | $3.939902307 \times 10^{-10}$ |

The invention claimed is:

1. A ultrasonic fluid meter comprising:
a conduit in which a fluid can flow;
an ultrasonic measurement device comprising two transducers arranged to emit and receive ultrasonic signals in the conduit, the ultrasonic measurement device being arranged to evaluate a current flow rate of the fluid from the time of flight of the ultrasonic signals between the transducers;
a valve positioned along a length of the conduit between the two transducers, the valve comprising a movable member which extends in the conduit and for which a current position can be regulated in order to control the current flow rate of the fluid;
a position sensor configured to measure the current position of the movable member;
a first pressure sensor arranged to measure a first pressure of the fluid in the conduit upstream from the valve and a second pressure sensor arranged to measure a second pressure of the fluid in the conduit downstream from the valve;
a processing circuit arranged, if the current position of the movable member is such that the current flow rate cannot be measured by the ultrasonic measurement device, to evaluate the current flow rate as a function of the current position of the movable member and of a pressure value representative of a difference between the second pressure and the first pressure.

2. The ultrasonic fluid meter according to claim 1, the processing circuit being configured, if the current position of the movable member is such that the current flow rate can be measured by the ultrasonic measuring device, to:
evaluate a pressure of the fluid at zero flow rate;
estimate the temperature of the fluid by using the pressure of the fluid at zero flow rate;
produce a first flow rate value from the time of flight of the ultrasonic signals between the two transducers and from the temperature of the fluid.

3. The ultrasonic fluid meter according to claim 2, the processing circuit furthermore being configured to:
produce a second flow rate value from the current position of the movable member and from the pressure value;
produce a consolidated flow rate value from the first flow rate value and from the second flow rate value.

4. The ultrasonic fluid meter according to claim 2, wherein, in order to evaluate the pressure of the fluid at zero flow rate, the processing circuit is configured to:
waiting until the current flow rate becomes zero;
then acquiring at least one measurement of the first pressure produced by the first pressure sensor a measurement of the second pressure produced by the second pressure sensor.

5. The ultrasonic fluid meter according to claim 1, the fluid being a compressible fluid, the fluid meter further comprising a temperature sensor configured to measure a temperature of the fluid in the conduit, the processing circuit being configured such that, if the current position of the movable member is such that the current flow rate cannot be measured by the ultrasonic measuring device, it also uses the temperature of the fluid to evaluate the current flow rate.

6. The ultrasonic fluid meter according to any one of the preceding claims claim 1, wherein the valve is a ball valve.

7. A method for measuring a current flow rate of a fluid, carried out in the processing circuit of an ultrasonic fluid meter according to claim 1 and, if the current position of the movable member is such that the current flow rate cannot be measured by the ultrasonic measuring device, comprising the step of evaluating the current flow rate as a function of the current position of the movable member and of the pressure value which is representative of the difference between the second pressure and the first pressure.

8. The measurement method according to claim 7, wherein, if the current position of the movable member is such that the current flow rate can be measured by the ultrasonic measuring device, it comprises the steps of
using the ultrasonic measuring device to measure the current flow rate;
waiting until the current flow rate becomes zero;
then acquiring at least one measurement of the first pressure produced by the first pressure sensor or at least one measurement of the second pressure produced by the second pressure sensor, and thus evaluating the pressure of the fluid at zero flow rate;
estimating the temperature of the fluid by using the pressure of the fluid at zero flow rate;
estimating a first flow rate value from the time of flight of the ultrasonic signals between the two transducer and from the temperature of the fluid.

9. The measurement method according to claim 8, further comprising the steps of:
producing a second flow rate value from the current position of the movable member and from the pressure value;
producing a consolidated flow rate value from the first flow rate value and from the second flow rate value.

10. The measurement method according to claim 7, further comprising the steps of:
defining a time interval between a time t1 and a time t2, such that at time t1, a difference between the second pressure and the first pressure changes from a zero value to a value which is higher than a predefined threshold, and at time t2, the difference between the second pressure and the first pressure changes from a second value which is higher than the predefined threshold to the zero value,
integrating the current flow over the time interval and thus evaluating a volume of fluid distributed via the conduit.

11. A non-transitory computer readable storage media cmprising instructions which cause the processing circuit of the meter to execute the steps of the measurement method as claimed in claim 7.

12. A method for regulating a current flow rate, which is carried out in a processing circuit (5) of an ultrasonic fluid meter according to claim 1 and comprising the steps of:
acquiring a flow rate setpoint;
estimating the current flow rate using a method for measuring a current flow rate of a fluid, carried out in the processing circuit and, if the current position of the movable member is such that the current flow rate cannot be measured by the ultrasonic measuring device, comprising the step of evaluating the current flow rate as a function of the current position of the movable member and of the pressure value which is representative of the difference between the second pressure and the first pressure;
adapting the current position of the movable member as a function of a difference between the flow rate setpoint and the current flow rate.

13. A non-transitory computer readable storage media which can be read by a computer, on which a computer program comprising instructions which cause the processing circuit of a meter to execute the steps of the regulation method according to claim 12 is stored.

* * * * *